US006163683A

United States Patent [19]

Dunn et al.

[11] Patent Number: 6,163,683

[45] Date of Patent: Dec. 19, 2000

[54] BROADCAST DATA RADIO SYSTEM AND RECEIVER APPARATUS THEREFOR

[75] Inventors: James M. Dunn, Ocean Ridge, Fla.; Peter S. Lee, Calabasas Park, Calif.; Edith H. Stern, Boca Raton, Fla.; Barry E. Willner, Briarcliff Manor, N.Y.

[73] Assignee: International Business Machines Corporation, Armonk, N.Y.

[21] Appl. No.: 09/256,569

[22] Filed: Feb. 24, 1999

[51] Int. Cl.[7] ................................ H04B 1/18; H04K 1/00

[52] U.S. Cl. ........................... 455/151.1; 455/45; 455/88; 455/150.1; 455/166.2; 455/179.1; 455/186.1

[58] Field of Search .................................... 455/132, 133, 455/142, 150.1, 151.1, 45, 88, 166.2, 179.1, 180.1, 184.1, 186.1

[56] References Cited

U.S. PATENT DOCUMENTS

| | | | |
|---|---|---|---|
| 5,280,636 | 1/1994 | Kelley et al. | 455/132 |
| 5,774,798 | 6/1998 | Gaskill | 455/132 |
| 5,805,989 | 9/1998 | Ushida | 455/132 |
| 5,903,598 | 5/1999 | Hunsinger et al. | 375/209 |
| 5,913,155 | 6/1999 | Tomiyama | 455/142 |

*Primary Examiner*—Fan Tsang
*Assistant Examiner*—Simon Nguyen
*Attorney, Agent, or Firm*—Robert Lieber; Richard A. Tomlin

[57] ABSTRACT

A presently disclosed radio broadcasting system for a virtual radio program broadcasting station uses a divided regional approach to broadcast digital and analog signals over a large geographic region divided into multiple overlapping but separate areas constituting small portions of the region. The small areas are served by separate transmission sources/towers supplied from a common source central to the station. The system supports reuse of allocated transmission parameters within non-neighboring small areas in the region. The station is "virtual" because its central source need not be in any of the small areas, and because it uses different transmission parameters in neighboring small areas in a manner that previously would be used by plural different stations. System transmissions include information signals sent in both analog and digital forms. The analog signals representing audibly reproducible programs, and the digital signals include instructions for controlling operations of receiver devices operating in the region. The digital signals also may include audibly reproducible program matter and instructions for controlling insertion of that matter into a program stream defined by analog transmissions. These transmissions are particularly useful for varying tuning parameters of mobile receiver devices disclosed herein to automatically and seamlessly maintain the devices tuned to the respective virtual station throughout the region, while the devices are transported across virtual boundaries between the small areas within the region. The system enables the virtual station to alternately present audible matter of general interest throughout the region and audible matter relevant exclusively to a small area within the region (e.g. advertisements specifying locations and services offered by commercial establishments within a respective area, and announcements specifying locations of public facilities such as libraries, hospitals, etc.). Transmitted digital information is retained in mass storage units associated with receiver devices and is used for adjusting tuning parameters as a device is transported across the small areas of the region, as well as for providing a portion of the program content that is played at the device during such movement.

11 Claims, 3 Drawing Sheets

Data Radio Receiver

| Digital Signals | | Analog Signals | |
|---|---|---|---|
| **Form** | **Content** | **Form** | **Content** |
| Digital on locale-specific carrier | Same in all local areas of served region (music, news, etc.) | Analog on locale-specific carrier; continuous and/or intermittent | Specific only to present local area (local ads, etc.) |
| Digital on locale-specific carrier | Control reference signals and instructions | | |

BROADCAST DATA RADIO SYSTEM AND RECEIVER APPARATUS THEREFOR

GLOSSARY

| | |
|---|---|
| Broadcast Channel | (abbreviated BC) a term used here to characterize a primary channel for broadcasting radio or television programs from a single station source over a geographic region spanned by multiple transmission towers |
| Data Radio | a term used here to characterize a radio system that broadcasts both digital and analog information over a geographic region subdivided into local areas served by separate transmission towers; also used to characterize receiving devices for detecting and utilizing transmissions of such systems |
| Data Channel | refers to a secondary channel, digital or analog, used in present data radio systems to download control data and radio program information (audio and/or video) for storage at mobile data radio receivers; wherein the stored program information is subject to being played at respective receivers during pauses in transmission of other program information that is to be instantaneously played at the receivers |
| GPSS | Global Positioning Satellite System in common usage today |

BACKGROUND OF THE INVENTION

This invention concerns a system for broadcasting radio and/or television programs, and receiver apparatus and devices compatible with this system. The broadcasting system transmits digital data, in addition to analog program information. Consequently, the system and associated receiving devices are characterized presently by the term "data radio".

In today's radio broadcasting environment, mobile receivers of broadcast programs (e.g. radios used in cars and trucks, and TV sets used in motor homes), are manually set by their users to a desired program channel (or station) served by a single transmission tower, and remain tuned to that channel until transmitted signals are no longer receivable with clarity. At that point, the user can either turn the receiver off or tune it to another program channel which typically would originate from a different source and contain program matter different from what was previously being received. This is both an unnecessary distraction for operators of vehicles containing such receivers, and tends to negatively affect commercial interests of disseminators of such programs by unduly limiting the geographic range of their transmissions.

This environment is based upon and derives from the earliest and most primitive forms of radio broadcast transmission, wherein a program carried on a single frequency spectrum could be received over a large geographic region restricted only by the power of transmitters and the sensitivity of receivers. Thus, a broadcast transmission station supported by commercial advertising would generally transmit commercial program materials having general geographic relevance rather than locale-specific relevance; e.g. advertisements specific to a product sold throughout the broadcast region, or a commercial establishment having many outlets in the region, rather than advertisements specific to a business enterprise operating in a specific locale constituting a small portion of the region.

However, we observe presently that the recent evolution of cellular telephone technologies, wherein a large geographic region is divided into multiple smaller regions served by separate cellular transmitters, provides a convenient basis for enabling radio program broadcasters to substantially expand their regions of operation, by reusing allotted frequency spectra in non-adjacent "cellular" locales, and this togetherwith othertechniques presently contemplated and described herein could lead to delivery of unique services to receivers of such programs and also create unique new business opportunities for respective broadcasters.

SUMMARY OF THE INVENTION

In the presently contemplated system for radio program broadcast delivery, a single virtual radio station having a minimal allotment of frequency spectra to use can effectively broadcast a radio program over an unusually large geographic range, on the order of hundreds or thousands of miles in diameter, by subdividing the range into multiple smaller areas or locales served by separate broadcast transmitters (towers), and reusing allotted frequency spectra in non-adjacent areas. Radio programs transmitted throughout the covered range would include information of general interest (music, national and international news, etc.) and information having "locale-specific" relevance unique to small local areas served by individual towers. Data transmitted in a secondary channel would control automatic switching of data radio receivers between different frequency spectra or channels used in adjacent local areas, so as to keep such receivers continuously tuned to the same general interest program while they are being transported across virtual boundaries between local areas, and also control the locale-specific content of programs delivered to respective receivers within each local area. Data sent in the secondary channel would also be useful to: 1) control storage of program information at receivers for delayed playing; 2) allow for and coordinate alternate playing at receivers of instantly transmitted and previously stored program materials; 3) allow for such alternate playing of pre-stored and instantly transmitted program materials to alternately present users of respective receivers with program materials having general relevance throughout the virtual range and program materials having only locale-specific relevance to the immediate local area of transmission (e.g. ads specifying locations of specific hotels, gas stations, restaurants, etc., within the immediate area); 4) allow for presentation of program materials having locale-specific relevance within separate program channels operated by the same virtual broadcaster (e.g. in a channel dedicated to lodging information, a channel dedicated to sightseeing features, etc.); 5) allow for controlling receivers so as to effectively assign such separate local channels to different tuner settings of the receivers; and 6) allow for data controlling the foregoing operations and constituting a portion of the presented program matter to be downloaded to storage at respective receivers while respective receivers are either actively tuned to a given channel or station and also while respective receivers are inactive (e.g. while their users are listening to tapes, CD's, etc.).

Thus, by using different carrier frequencies and/or modes of transmission in adjacent local areas, which areas may constitute small parts of a virtual data radio station's range, the station can have a virtual range that can grow to almost any size. Furthermore, the presently contemplated usage of secondary channels for data transmittal allows the virtual station to control receivers so as to keep them continuously tuned to the same general program content (e.g. a music program) as they cross virtual boundaries between local areas, and also expand the station's scope of commercial coverage so as to allow for presentation of locale-specific commercials within individual local areas. It also can increase station profitability by expanding the number of local advertisers that can be served within a region containing many local areas.

Transmission towers operated in local areas by the presently contemplated virtual data radio station continuously broadcast cell identification (ID) data signals associated with their locations. Similar ID transmissions are commonly used in present cellular telephone systems and wireless personal communication systems (PCS). Satellite communication systems also use a similar concept to identify the receiver frequency covered by a spot pattern servicing an area, although the area is very large and could encompass several states and/or a large stretch of ocean.

ID data transmitted within a local area is used to automatically adjust tuning of data radio receivers carried across boundaries between adjacent local areas, while the receivers are tuned to the respective virtual station.

One way to accomplish this is to use a method similar to what is done presently to control reception by cellular telephones. In this method, transmitters in adjacent local areas/cells broadcast respectively unique ID's over a predetermined command and control frequency or channel. Circuits at receivers separately detect the signals representing these ID's and choose the strongest signal to capture. However, unlike cellular telephones, present receivers also detect and follow commands sent with the chosen signal to select a specific program frequency or channel appropriate for continued reception of program materials currently being broadcast regionally over many local areas.

Alternatively, a common command and control frequency or channel could be used to transmit a virtual station's sole ID along with data defining program frequencies or channels used by the respective station throughout a region encompassing many local areas. Receivers tuned to that station would use that data to determine the local area in which they are instantly situated, and select a program frequency or channel appropriate to continued reception.

Alternatively, data defining program frequencies or channels used in local areas throughout a region could be pre-stored in or adjacent to receivers and used to direct respective receivers to a program frequency or channel suited for continued reception of the station's program within the area immediately containing the receiver. Such data could for instance comprise a list of candidate frequencies (or channels) associated with ID's used by a virtual station in an area encompassing multiple local regions. Receivers could examine this list to associate an ID currently being received to the frequency appropriate for receiving broadcasts of the respective virtual station in the present locale. The information in such lists could be provided either during earlier transmissions of the respective virtual station or through other means such as a smart card or other media.

Alternatively, receivers may include a position locating mechanism based upon communication with earth satellites—e.g. a mechanism similar to, but perhaps not quite as precise as, present-day Global Positioning Satellite System (GPSS) devices—to determine immediate locales, and use such locale-specific information togetherwith stored frequency lists to automatically tune to a specific frequency appropriate for maintaining reception of a virtual station's programs as local area boundaries are crossed.

A feature of this invention is that receivers entering a cell area can be tuned to receive or play program information of general interest (e.g. selections of classical music) interspersed with advertisements or announcements of locally-specific context.

The advantage to users is that they remain tuned to general program content that they desire to receive. The advantage to the virtual station proprietor is that this creates new service and revenue opportunities; for example, opportunities to present commercials specifying locations of specific outlets for services and/or products within individual local areas.

Another feature is that program information to be played over a long period (e.g. musical selections to be played over one or more hours) can be transmitted to users at intervals convenient to the station system, stored in digital form in on-board storage devices located in or near respective receivers, and applied to respective receivers to be played until control signals calling for interruptions are sent by the virtual station. Such interruptions can be used to have receivers receive and play instantly broadcast program matter with locally-relevant content (e.g. ads specifically relevant to local commercial establishments, announcements relevant to local services and public institutions, etc.).

This would have advantages of conserving both power and bandwidth in transmissions of general program content from common central facilities operated by a station, as well as conserving average power usage by transmitters in local areas.

For example, program materials to be stored for subsequent play could be transmitted to local stores (stores located at or in receivers) during off-peak periods of station activity. These periods could be intervals between broadcasts of locally specific materials, late night intervals, or even intervals during which the receivers are not using their radio function (e.g. while they are playing recorded media such as tape, CD, etc.).

Alternatively, downloading of such materials to be stored (at or in receivers) for later play could be based on specific characteristics of the method used for transmission of other program materials. For example, transmissions using carriers having single sideband (SSB) or double sideband (DSB) characteristics (to receivers equipped to receive such carriers) could use one or both sidebands for the downloading function.

Another application of this combined use of on-board storage and real-time reception would be to have mapping data for all cells downloaded to or pre-installed in on-board storage devices, and have receivers with video capability use the broadcast cell ID to select and display maps specific to cells in which they are currently located. Contrary to the maps provided by more expensive GPSS locating systems, this type of map would not indicate the user's precise location. Alternatively, such maps could be provided in the form of pre-recorded audible announcements that would enable a user/listener to interact with on-board data processing equipment to receive audible directions to a specific local destination. For instance, the user could key in a local street, highway or landmark representing the users immediate location, followed by entry of a local destination address or institution, and receive audible announcements giving driving directions to that destination.

Another potential use of such on-board storage is to provide a pre-recorded set of announcements with locale-specific content. These could be used together with the broadcast cell ID to have the receiver play advertisements specific to both the cell locale and a sponsor; e.g. to play a hotel channel giving locations of hotels and motels in the immediate area.

Another potential use of this technique would be to have the receiver play locally recorded materials (e.g. musical selections) continuously and interrupt to play broadcast transmissions of local interest. This in effect is the reverse of normal radio or TV "live" broadcasts of general material with spot insertions of pre-recorded commercials and announcements.

The pre-recorded matter locally stored could be downloaded at predetermined intervals or continuously, depending upon the amount of data to be downloaded and the available transmission bandwidth for that function. Some of this data may represent content and some may represent pointers to previously stored materials. In this type of usage, the downloading could be either direct to the end user of receivers or direct to establishments frequented by such users (gas stations, auto repair shops, etc.) which would transfer downloaded materials to user storage devices.

The following description will inform those skilled in the relevant radio broadcasting arts of many other uses, advantages and commercial opportunities that are obtainable by means of this invention.

DETAILED DESCRIPTION

Figure 1:
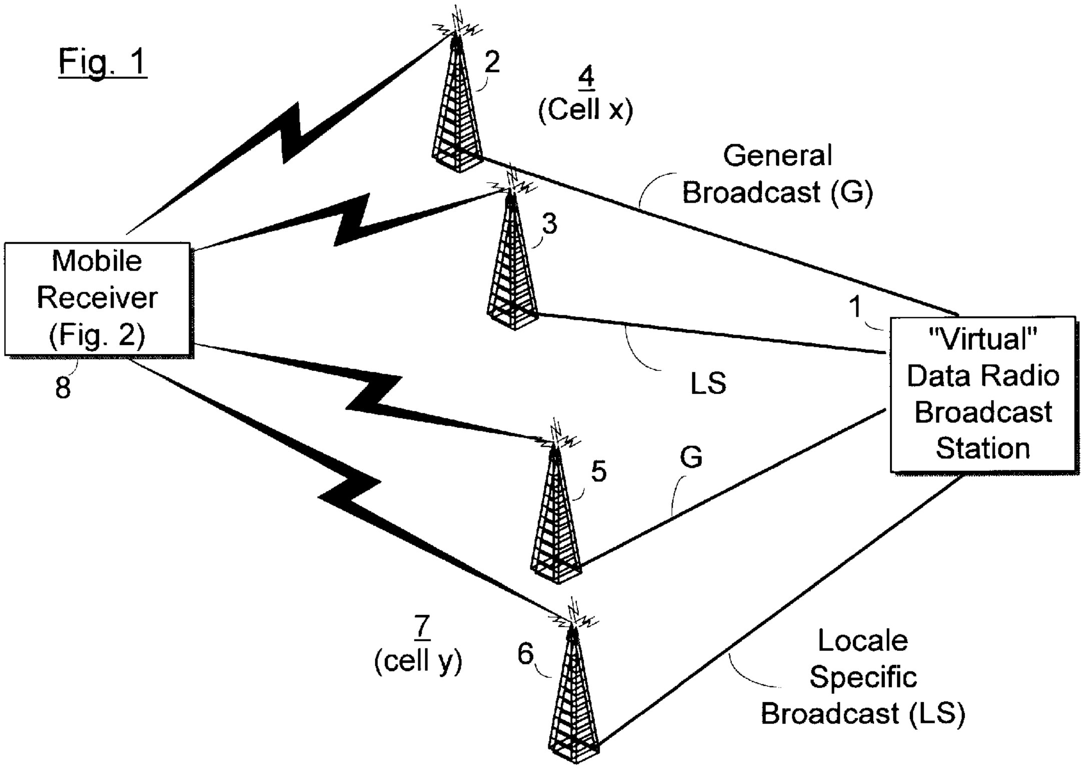
FIG. 1 is a simplified schematic depiction of a "virtual" data radio station network operating in accordance with this invention.

Referring to FIG. 1, virtual data radio station 1 operates transmission towers 2 and 3 in one cellular region 4 designated cell x, and transmission towers 5 and 6 in an adjacent cellular region 7 designated cell y. Station 1 is called virtual because it need not have any specific location, and may in fact be distributed over several locations. The station is termed a data radio station because in addition to transmitting program information to the receivers that are tuned to it, it broadcasts data for controlling modes of operation of those receivers.

Towers 2 and 5 are used to transmit program materials (music shows, news broadcasts, etc.) of general interest (of interest beyond cell boundaries). Towers 3 and 6 are used to transmit data including locale-specific information. Mobile receiver 8 receives transmissions from towers 2 and 3 while in range of those towers, and from towers 5 and 6 while in their range. This works as follows.

For purposes of the discussion to follow it is assumed that a user selects presently described virtual stations manually; i.e. in much the same manner as is used today for tuning existing radio receivers to real stations. At this point, the presently contemplated data channel, for controlling automatic tuning adaptation as the receiver moves between cells, can function in either of two different modes.

The presently preferred mode is to have data sent from each cell tower indicate the specific frequency or channel used by the respective station for broadcasting program materials in the local cell area, as well as the specific frequencies or channels used in neighboring cell areas, in a manner requiring storage of that data at or in the receiver while the receiver is tuned to a cell region of the respective virtual station. That data is then used by receiver circuits, as cell boundaries are crossed (as indicated by fading ID signals in the control/command channel currently being received and strengthening ID signals in an associated neighboring control/command channel), to enable receivers to automatically determine and select frequencies or channels appropriate to maintaining continuous reception of the station's program.

An alternative method is to have cell towers of all virtual stations repeatedly broadcast all program frequencies or channels used by respective stations in local and neighboring cells, in a manner enabling receivers to store a set of program frequency or channel data for each virtual station operating in the area local to the receivers, so that the receivers are able to initiate reception of any station's program at any time and thereafter maintain continuity of reception automatically as cell boundaries are crossed.

Referring then to present FIG. 1, assume that a receiver such as 8 is instantly tuned to the program frequency or channel of virtual station 1, located in region 4 and moving towards region 7 and a (not-shown) virtual boundary between cells x and y. In this circumstance, receiver 8 is using a frequency or mode of operation designated by control data transmitted with the ID broadcast from tower 3. As the receiver approaches and eventually crosses that virtual cell boundary, ID signals from tower 3 become steadily weaker and those from tower 6 become progressively stronger. By comparing strengths of these signals, and sensing when the signal from tower 6 becomes stronger than that from tower 3, the receiver can effectively determine when it has crossed a cell boundary and entered region y. Then using data defining the program frequency or channel used in cell y, that data being stored prior to this event at or in the receiver, the receiver can switch its tuning reference, to the parameters appropriate to cell y, so that the user never perceives a loss of reception of program content broadcast by station 1.

For switching from the frequency or mode of cell x to that of cell y the receiver needs to associate the cell ID received from tower 6 to the respective program frequency or channel transmitted from that tower. Thus, it is understood that the data sent to and stored at the receiver needs to specifically associate each source of ID signals with a respective program frequency or channel; e.g. the data has to be steered into receiver storage in an appropriate context of association.

Receiver control data transmitted by towers 3 and 6 includes the aforementioned cell ID and other reception controlling data. Such other data may, for instance, include locale-specific tuning information to enable receivers to tune to program channels exclusively conveying local information; e.g. tuning information constituting parameters associated with reception of local channels devoted individually to location of local restaurants, local gas stations, local lodgings, local sightseeing attractions, etc. Given such parameters, it should be apparent that a receiver could dynamically assign those parameters to station selection knobs or the equivalent so as to enable the receiver's user to manually select a local restaurant channel or gas station channel, etc. Furthermore, it should be equally apparent that such parameters could be used to operate display indicators adjacent the station selection knob or equivalent element so as to indicate the type of information transmitted in the respective channel; e.g. to respectively indicate "restaurants" and "gas stations" when the selection knob/element is at settings respectively assigned to those functions.

Thus, the functional assignment of local channel parameters to such settings of a receiver selection element could be maintained constant as the receiver is moved across cell boundaries, but the specific tuning frequency or mode associated with assigned functions would change when that occurs.

Figure 2:
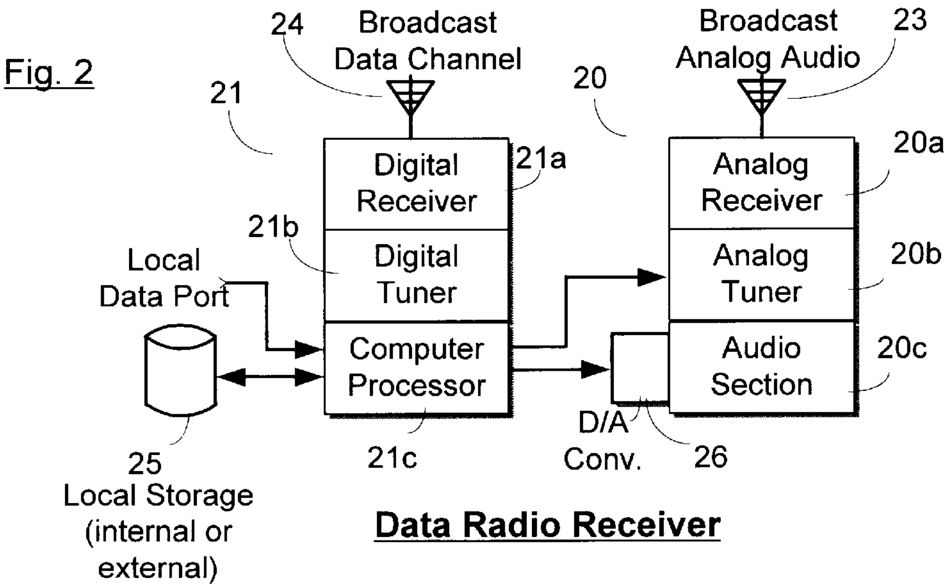
FIG. 2 is a simplified schematic of a mobile data radio receiver device for use in reception of transmissions broadcast by the virtual station network shown in FIG. 1.

FIG. 2 provides a simplified schematic view of the "data radio" receiver 8 shown in FIG. 1. The receiver has separate analog and digital sections, shown at 20 and 21 respectively.

Analog section 20 has a signal receiving subsection 20*a*, an analog tuner subsection 20*b* and an audio playing subsection 20*c*. Signal receiving subsection 20*a* is coupled to an antenna (or antenna portion) 23 designed to receive analog transmissions from local cell towers.

Digital receiver section 21 also contains three subsections responsive to digital data transmissions broadcast locally; a signal receiving subsection 21*a*, a digital tuner subsection 21*b*, and a data processing subsection 21*c*. Subsection 21*a* is coupled to antenna (or antenna portion) 24 designed to receive transmissions from local cell towers representing plural channels of digital data. Subsection 21*b* operates to tune to (select) one of these channels for association to a virtual station such as station 1. Processor subsection 21*c* cooperates with local storage apparatus 25 to receive and process data conveyed to it via tuner subsection 21*b*. Types of data typically received by subsection 21*c* include data for controlling functions of analog subsection 20*b* and data representing audio that is to be played through audio subsection 20*c*. Data representing audio to be played through is converted to analog form by digital to analog converter 26.

Data received in section 21 can also be used to control other tuning functions; e.g. to switch audio reception in section 20 between AM and FM modes, or to switch video reception tuning, in a television type receiver, between modes conducive to reception of high definition and low definition type signals. Such data also could be used to control variables associated with user preferences; e.g. volume range for audio play or color ranges for video play.

All such data should be subject to simultaneous storage in local storage device 25.

For that purpose, it is contemplated that device 25 is a mass storage fast access device, such as a hard drive or writeable compact disc drive, having a very large capacity on the order of multiple gigabytes. Processor 21*c*, as presently contemplated, consists of one or more computer chips operating at a nominal rate suited to functions presently supported; e.g. in terms of today's computer technology, a chip or chips operating at a rate of at least 233 Mhz. Such storage devices and processor chips, which are in common use today in "low end" personal computer devices, are becoming progressively cheaper, leading to the not unreasonable expectancy that they will soon be available for inclusion in appliances and products selling for $300 or less. Furthermore, advances in standard analog radio technology, involving implementation of tuning and demodulation functions in digital signal processor (DSP) units, have made it possible to implement the presently contemplated analog receiver section (with multi-mode and frequency agile capabilities) on a very economical basis. Therefore, it is believed that economical versions of the presently described apparatus can be made now with existing components and that such apparatus will become progressively cheaper to make in the future.

Figures 3, 4:
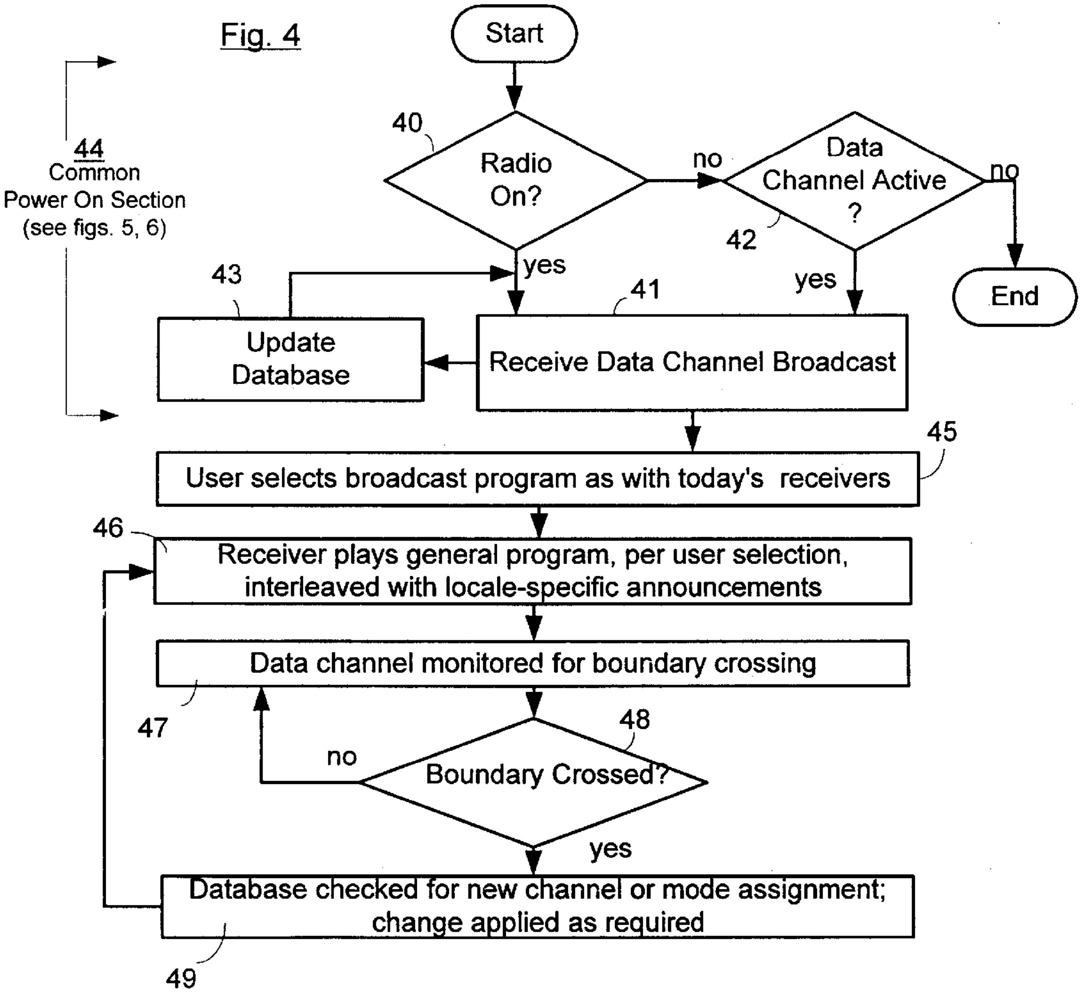
FIG. 3 is a simplified table exemplifying the form and content of typical information signals broadcast in accordance with the invention.
FIG. 4 is a flow diagram for explaining how the device of FIG. 2 operates to track and keep tuned to a single station that broadcasts on different frequencies or channels in neighboring local areas.

The table in FIG. 3 indicates the form and content of signals transmitted by the presently described virtual station system. Reproducible program materials are sent in both digital and analog forms on locale-specific carriers (or channels), and reference signals and control instructions, for controlling receiver operations, are sent in digital form on locale-specific carriers.

Program information will be sent in both digital and analog forms. Program information sent in digital form preferably would be information having relevance only to the immediate local area of transmission (e.g. ads and announcements specific to and specifying locations of commercial establishments and public facilities located in the immediate area), while programs sent in analog form will usually be the same in all areas of a served region, and handled in a form allowing receivers to keep continuously tuned to the respective program as they cross boundaries between adjacent areas. Those skilled in the relevant arts will readily appreciate that these preferred forms of program transmission could be reversed; i.e. that locale-specific program content could be in analog form and regional program content could be in digital form.

Program information may be sent (e.g. in bursts) and/or continuously. Program matter sent intermittently should be handled so as to enable receivers to coordinate alternate playing of discrete segments sent intermittently as they are received (e.g. to effect alternate playing of segments sent in analog and digital forms; digital segment, then analog segment, then digital segment, then analog, etc.). Multiple program segments transmitted in one form (e.g. digital) could be stored in storage device 25 prior to the time they are played (e.g. several hours worth of reproducible audio may be stored in a compressed form), and successive such stored segments may be played between instantaneous transmissions of short segments sent in intermittent mode (e.g. during intervals defined by control signals sent concurrent with the program segments). For intermittent transmissions, local area towers will usually be transmitting different program information in adjacent local areas.

Program information provided in either continuous or intermittent form also may be replayed in an audio channel that is separate from the channel in which regional programs are played; e.g. in a hotel channel devoted to ads from local hotels, a gas station channel devoted to ads from local gas stations, etc. Reception tuning or mode settings for this separate channel could be established by control information intermittently broadcast in each local area (preferably in digital form).

FIG. 4 shows how a receiver such as 8 (FIG. 1) operates to power up and establish internal station settings within a local cell region (such as 4 or 7, FIG. 1).

Decision 40 indicates that when the receiver powers up, it begins to receive data transmitted through the data channel of the station to which it is currently tuned (operation 41, FIG. 4). Decision 40 implies additionally that if the receiver is not powered on but its data reception channel is continuously active (decision 42) it may continue to receive transmitted data via process 41; and if its data channel is inactive when analog reception power is off the receiver is fully inoperative.

The foregoing requires the following qualification. The presently contemplated mode of transmission is to have each virtual station send its own data and analog information channels, generally one of each. Thus, if a station's analog and digital transmission channels are inactive, the receiver may still be powered on and tuned to another station.

Alternatively, digital information for all virtual stations could be transmitted in multiplex, on a common carrier allocated to all stations, one channel per station. In this mode, the area towers transmitting the digital information could either be commonly owned by all stations or owned by one or more stations and have channels leased to other stations. Receiverwould receive digital channels of stations to which they are immediately tuned by a simple demultiplex procedure.

While data reception process 41 is active, process 43 for updating local database information (e.g. at 25, FIG. 2) is executed in accordance with requirements of incoming data defining synchronization control functions for alternately playing stored and instantly broadcast programs.

Figure 5:
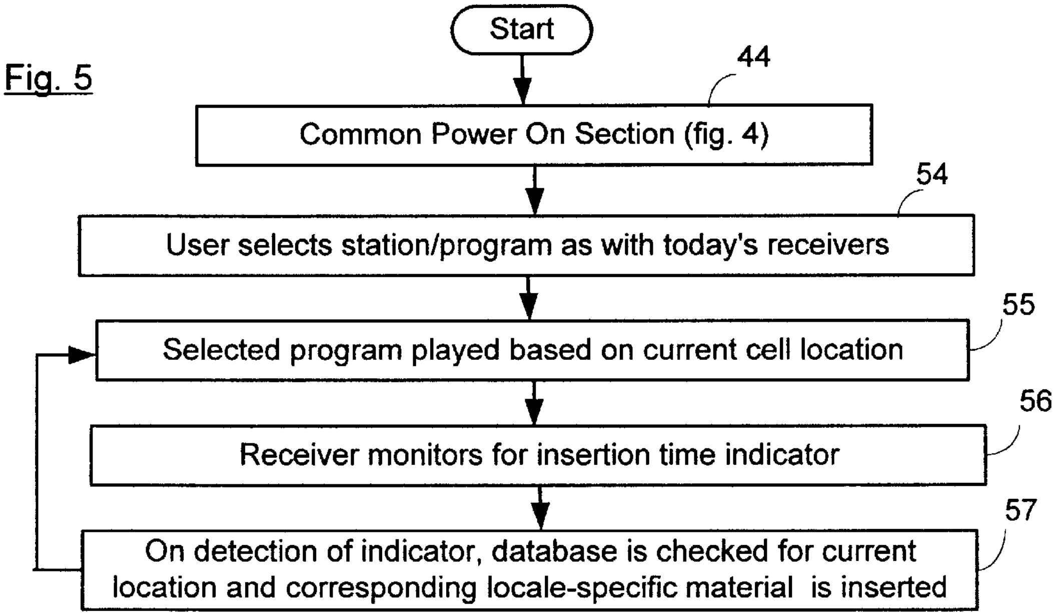
FIG. 5 is a flow diagram for explaining how the device in FIG. 2 would be operated to play locale-specific instantly transmitted audio during preset pauses in instantaneous broadcast of general program content.
Figure 6:
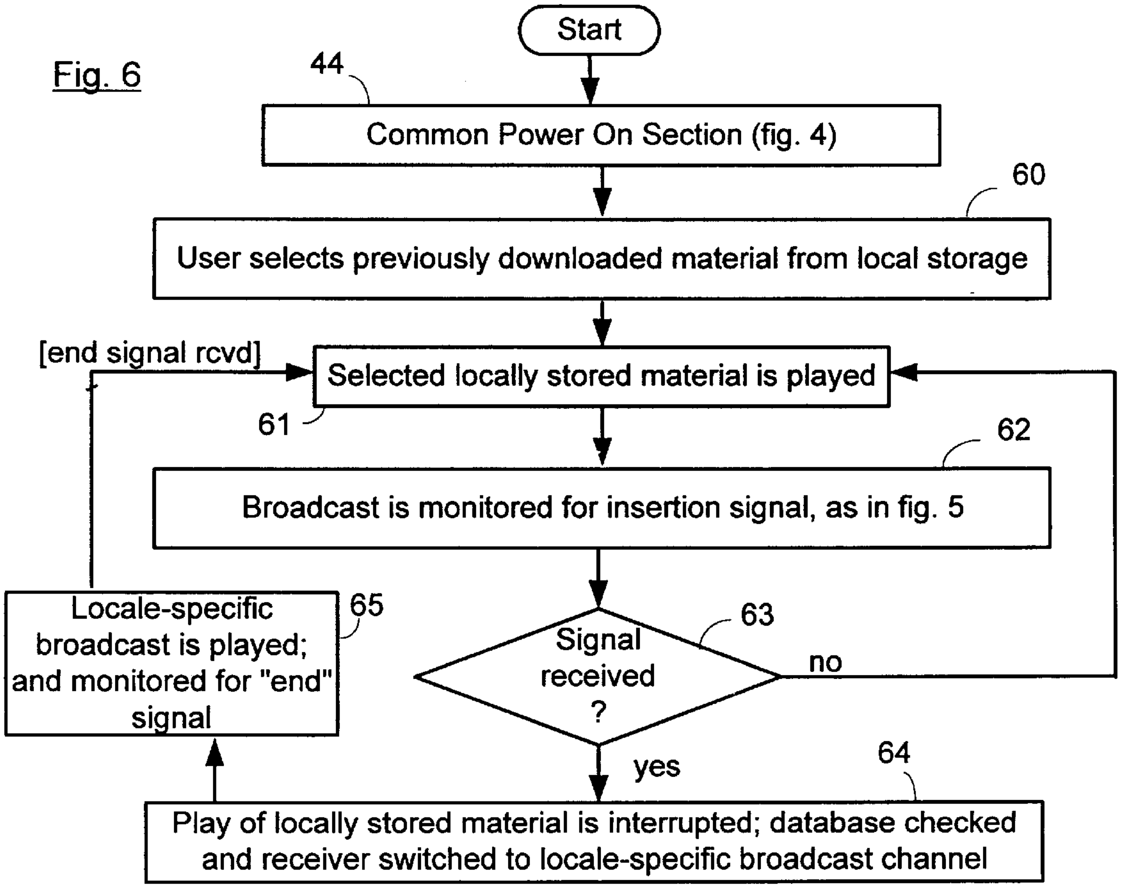
FIG. 6 is a flow diagram for explaining how the device in FIG. 2 is operated to store and play general program information transmitted in short-duration bursts, and to intersperse playing of instantly broadcast locale-specific information during pauses of predetermined duration and timing in the general program that are defined by control information transmitted with the general program audio information.

As indicated at 44, functions 40–43 represent a power-on procedure that is common to other receiver processes described in FIGS. 5 and 6.

Database information of the kind just alluded to may include both control information (e.g. information for controlling receiver tuning and usage of stored program information) and program content (e.g. program matter to be played at prescribed times). It should be understood that such information may be stored in either a single database file or multiple database files. It should be understood also that the type of database application used may vary based on characteristics of the receiver apparatus. For instance, a video receiver might use a multimedia type database, whereas a simpler type of database could be used to store information pertaining only to reception control.

When power-on processing is complete, the user of the receiver (manually) selects a program channel/station as with today's receiving devices (block 45, FIG. 4). The receiver's analog section then plays program materials received through the analog channel, interrupted occasionally to play digital materials that are either instantly received through the digital channel or that have been previously received and stored in local storage device 25. This process is indicated in block 46.

While this is occurring, the receiver monitors station ID signals received through its digital channels to determine when a cell boundary has been crossed (block 47 and detection function 48). As explained earlier, the receiver detects boundary transitions by comparing ID signals (or other signals) received from the nearest transmission towers, and determining when the signal currently used to establish the reception frequencies/modes is weaker than one coming from another transmission source. When the crossing is detected, the database is checked for the new frequency or mode associated with the now stronger signal, switches the reception to that frequency or mode (block 49) and continues (seamlessly) to continue playing the program material that was playing before the crossing (block 46).

FIG. 5 shows how presently contemplated receivers can be operated to interleave and play analog and digital program segments that are transmitted intermittently and either concurrently or time-staggered in relation to each other. Assume the receiver has been powered on (block 44) and the user has selected a virtual station that is broadcasting locally in this mode (block 54). Assume further that the receiver is instantly playing a program segment defined by digital signals (block 55). At this time the receiver monitors received control signals (block 56) for a signal representing an insertion time indicator that preferably is sent in digital form but could be sent in analog form and still produce the effects described next On detection of this indicator, the receiver's digital section examines a stored database of local setting information (block 57) and uses that setting information for switching operation of its audio section (e.g. 20*c*, FIG. 2) to play a segment of locale-specific program material that is instantly being transmitted in analog form by the source station (refer to FIG. 3). Information for updating the database of setting information may be transmitted intermittently in each local area and stored (e.g. in stores 25) by receivers operating in the area that are tuned to the source station.

The database of local setting information can be installed and/or updated:

- at special installation facilities (e.g. auto dealership or service shop) via either wired or wireless connection to source mechanisms at such facilities, or
- via transmissions sent from virtual stations; such transmissions either coinciding with or occurring separately from ongoing program transmissions.

After playing a locale-specific segment the receiver returns to the operation shown in block 55 and resumes playing regional program material that is instantly being transmitted in digital form.

FIG. 6 indicates how receivers can operate to interleave play of program segments sent in digital and analog form, like in FIG. 5, but where the regional/digital program segments are transmitted in a massive burst (e.g. in a burst containing several hours of playable audio, in compressed form, constituting many segments of interruptible programming), and stored at or near the receiver prior to play. Bursts containing such information may be repeatedly broadcast by the source station at predetermined intervals (e.g. hourly), and continuously extended with additional materials when appropriate.

Control signals sent with the bursts include a burst identity indicator enabling receivers to determine if program information currently stored is the same as that currently being sent in a burst. If the information is the same, the burst is ignored, but if the burst contains new information it is downloaded to the receiver's store.

Thus, as seen in FIG. 6, when a receiver is powered on and set to a selected station (e.g. one instantly selected by its user or one to which the receiverwas set when previously turned off), the receiver selects a program segment from its digital store (block 60) and plays that segment (block 61) while monitoring its incoming transmissions for an insertion signal as in FIG. 5 (block 62 and decision 63).

The program material played from local storage may be varied according to user preferences and tastes; e.g. one user might have his system play classical music, another play rock music, another play the reading of a book, etc. Thus, the material played from local storage by different users may have different synchronization requirements relative to programs sent intermittently by a station. Therefore, the local storage database could for example contain periodic markers of time (e.g. markers recurring at 5 minute intervals), which when selected would enable the receiver apparatus to play locally stored program matter for the time remaining until the next transmitted interrupt signal signifying the start of a new transmitted segment.

Process 62 continues (via the "no" path leading out of decision 63) until the insertion indicator is detected. When the indicator is detected ("yes" exit at 63), play of the locally stored program material is interrupted and the receiver audio section is controlled to play a locale-specific program segment instantly being transmitted in analog form (block 64). At the end of that segment (detected in block 65; e.g. by detection of an "end" control signal transmitted at the appropriate time), the receiver is controlled to resume play of the stored program material at the point of interruption (audio play returns to the process of block 61).

What is claimed is:

1. Mobile data radio receiver apparatus for receiving concurrently broadcast transmissions of radio signals arranged in digital and analog forms, said signals sent by a single virtual radio station having plural antennas situated in plural separate areas within a larger geographic space, each of said antennas having sufficient signal strength to span a single respective area in said larger space; said signals being carried as modulation on different frequency parameters in adjacent said areas; said signals being used to present a single radio program across said larger space; at least part of said single radio program having the same content in all of said areas; said apparatus comprising:

digital and analog reception modules respectively adapted to separately receive and process said concurrently broadcast radio program signal transmissions in said digital and analog forms; and circuits connecting said modules for varying program playing operations in said analog module in response to broadcast digital transmissions received in said digital module, said varied operations including operations serving to automatically maintain the respective receiver continuously tuned to said single virtual station as said receiver is transported across a virtual boundary between neighboring said areas spanned by different ones of said antennas.

2. Mobile receiver apparatus in accordance with claim 1 wherein said virtual station deliberately introduces pauses in transmission of said analog signals at said antennas; said apparatus including:

data storage apparatus coupled to said digital module for storing data contained in said broadcast transmissions received in said digital form; said stored data including information subject to audible reproduction; and wherein said circuits connecting said modules include:

a digital to analog converter for applying said digital section to apply stored information subject to audible reproduction to said analog section for intermittent playing in said analog section during said deliberately introduced pauses.

3. Mobile receiver apparatus in accordance with claim 2 wherein said digital module in said receiver apparatus is effective in response to said transmissions in digital form to vary reception tuning in both said digital and analog modules, while said receiver apparatus is being transported across a virtual boundary between neighboring said local areas, for effectively keeping said apparatus continuously tuned to said single virtual station while and after said apparatus is transported across said virtual boundary.

4. Mobile data radio receiver apparatus in accordance with claim 3 wherein:

said broadcast transmissions include audibly reproducible signals containing the same information content in each said area and other audibly reproducible signals containing different information content in each said area.

5. Mobile data radio receiver apparatus in accordance with claim 2 wherein said digital module is capable of operating to receive said signals broadcast in said digital form while said analog module is idle and wherein said storage apparatus is capable of storing said signals for use in controlling operations in said analog module when said analog module subsequently becomes active.

6. Data radio apparatus in accordance with claim 1, wherein said reception modules and connecting circuits are housed in a moveable vehicle, said vehicle containing data storage apparatus for storing data received by said digital module; said data storage apparatus being coupled to said reception modules and connecting circuits and being configured and sized to be able to store instructions for operating both said digital and analog modules as well as determining radio programs to be audibly played in said apparatus.

7. Data radio apparatus in accordance with claim 6 wherein said data stored in said data storage apparatus includes audibly reproducible program material and instructions for having said audibly reproducible material reproduced and played in said apparatus during predetermined pauses in transmissions of other audibly reproducible program materials instantly being received in said reception modules.

8. Data radio apparatus in accordance with claim 7 wherein said stored data is configured to have playing of said stored programs activated by interruption signals transmitted when said predetermined pauses are initiated.

9. Data radio apparatus in accordance with claim 7 wherein said stored data is configured to have playing of said instantly broadcast programs resumed when said predetermined pauses are ended.

10. A data radio broadcasting system for a virtual radio program broadcast station spanning a plurality of discretely separate areas within a larger geographic space encompassing all of said areas; said system using different signal carriers within adjacent said areas but providing common radio program content within all of said areas; said system comprising:

plural sources of broadcast signal transmissions operating in respective ones of said plural areas and having respective transmission ranges spanning only respective ones of said areas; said sources concurrently broadcasting signals in digital and analog forms in their respective areas; said signals in analog form including signals representing audible programs to be played by receiver apparatus operating in respective said areas, and said signals in digital form including both signals for controlling operations of said receiver apparatus within respective said areas and signals representing audibly reproducible program matter; said signals controlling said operations including signals for automatically keeping receiver apparatus continuously tuned to said virtual station as said receiver apparatus is transported across virtual boundaries between neighboring said areas.

11. A data radio program broadcasting system in accordance with claim 10 wherein said signals for controlling operations of said receiver apparatus include signals for keeping said receiver apparatus continuously tuned to said virtual broadcast station as said receiver apparatus is transported beyond the transmission range of one of said sources and into the transmission range of another one of said sources.

* * * * *